United States Patent
Pares Isanta

(10) Patent No.: US 7,946,794 B2
(45) Date of Patent: May 24, 2011

(54) QUICK FASTENING NUT

(75) Inventor: Albert Pares Isanta, Barcelona (ES)

(73) Assignee: ITW Espana, S.A., Barcelona (ES)

( * ) Notice: Subject to any disclaimer, the term of this patent is extended or adjusted under 35 U.S.C. 154(b) by 30 days.

(21) Appl. No.: 11/037,019

(22) Filed: Jan. 19, 2005

(65) Prior Publication Data

US 2005/0163591 A1  Jul. 28, 2005

(30) Foreign Application Priority Data

Jan. 26, 2004  (ES) .................................. 200400154

(51) Int. Cl.
*F16B 39/22*  (2006.01)

(52) U.S. Cl. ........................................ 411/301; 411/190

(58) Field of Classification Search .................. 411/309, 411/301, 437, 433, 491, 441, 440, 183–188, 411/166, 171, 172, 176, 177, 181, 190, 204, 411/223, 237, 303, 321, 324, 349, 549, 551, 411/554, 957, 999; 16/4, 8; 24/297
See application file for complete search history.

(56) References Cited

U.S. PATENT DOCUMENTS

| | | | | |
|---|---|---|---|---|
| 2,056,688 A * | 10/1936 | Peterka et al. | ................. | 411/399 |
| 2,908,309 A * | 10/1959 | Brill | ............... | 411/301 |
| 3,001,567 A * | 9/1961 | Brill | ............... | 411/277 |
| 3,030,997 A * | 4/1962 | Collins | ........... | 411/301 |
| 3,145,751 A * | 8/1964 | Boots | ............... | 411/282 |
| 3,221,790 A * | 12/1965 | Poupitch | ........... | 411/301 |
| 3,326,260 A * | 6/1967 | Tucker | ............. | 411/303 |
| 3,350,975 A * | 11/1967 | Bien | ................ | 411/437 |
| 3,364,807 A * | 1/1968 | Holton | ............. | 411/436 |
| 3,387,642 A * | 6/1968 | Bennett | ............. | 411/303 |
| 3,388,732 A * | 6/1968 | Holton | ............. | 411/167 |
| 3,434,521 A * | 3/1969 | Flora | ................ | 411/180 |
| 3,729,757 A * | 5/1973 | Wright | ............. | 470/19 |
| 3,886,989 A * | 6/1975 | Strange | ............. | 411/303 |
| 4,341,053 A * | 7/1982 | Dettfurth et al. | ............. | 52/787.1 |
| 4,378,913 A * | 4/1983 | Fohl | ................ | 242/599.3 |
| 5,326,208 A * | 7/1994 | Werner | ............. | 411/437 |
| 6,162,002 A * | 12/2000 | Rohrmoser et al. | .......... | 411/441 |
| 6,164,889 A * | 12/2000 | Konig et al. | ................. | 411/436 |

(Continued)

FOREIGN PATENT DOCUMENTS

DE   3023452 A1   1/1982
DE   19944685 A1   3/2001

(Continued)

OTHER PUBLICATIONS

Office Action for JP2005-018632 mailed Feb. 23, 2010.

*Primary Examiner* — Shane Bomar
*Assistant Examiner* — Roberta Delisle
(74) *Attorney, Agent, or Firm* — Lowe Hauptman Ham & Berner LLP

(57) ABSTRACT

Of application in processes of assembly by screwing between a plastic piece and a supporting base, for example a bodywork, from which a fastener stands out perpendicularly. It is constituted by a circular base and a hexagonal body traversed by a central drilled hole which passes through and has a main segment and an expansion in which are some slightly arched internal protuberances which constitute the fastening means for connection of the nut to the fastener after a slight rotation of or pressure from the former and it determines the fastening and provisional positioning of the plastic piece with respect to the supporting base prior to its screwing. During the screwing operation the cutting effect which the metal fastener applies on the plastic walls of the drilled hole gives rise to a thread.

20 Claims, 3 Drawing Sheets

U.S. PATENT DOCUMENTS

| | | | |
|---|---|---|---|
| 6,170,858 B1 * | 1/2001 | Berger | 280/728.2 |
| 6,540,462 B1 * | 4/2003 | Bretschneider et al. | 411/82 |
| 6,729,822 B2 * | 5/2004 | Sbongk | 411/433 |

FOREIGN PATENT DOCUMENTS

| | | |
|---|---|---|
| DE | 10149022 A1 | 4/2006 |
| EP | 172665 A1 | 2/1986 |
| EP | 1 273 811 A2 | 1/2003 |
| EP | 1350712 A2 | 10/2003 |
| JP | 343383 U | 5/1944 |
| JP | 60-73987 U | 5/1985 |
| JP | 7-41179 U | 7/1995 |

* cited by examiner

QUICK FASTENING NUT

RELATED APPLICATIONS

The present application is based on, and claims priority from, Spanish Application Number 200400154, filed Jan. 26, 2004, the disclosure of which is hereby incorporated by reference herein in its entirety.

OBJECT OF THE INVENTION

The present invention relates to a quick fastening nut fundamentally for application in the field of motor vehicles, especially to facilitate the tasks of assembling complementary pieces that are complicated to handle, such as plastic pieces, to a supporting base, such as vehicle bodywork (chassis), during the assembly phase.

It is an object of the invention that the quick fastening nut has means which facilitate its connection to a fastener (such as threaded member or stud) which extends from a supporting base of a vehicle for the purpose of connecting the complementary piece to the supporting base without the need for mechanical or manual auxiliary means to temporarily hold the complementary piece in position prior to its final screwing to the supporting base.

It is also an object of the invention that the nut employed is configured in plastic material initially without a thread and that the thread is formed during its screwing to the fastener.

BACKGROUND OF THE INVENTION

During the assembly phase in the production of vehicles, assembly work is carried out between different pieces, the connection being habitual by means of nut and screw between the piece to connect and the bodywork of the vehicle, such is the case with the sides of the doors, under-parts of the vehicle and other components.

In the case of simple pieces the solution for connection does not present any problem, since the operative can hold the piece with one hand at the same time as he uses the other hand to hold the screwdriver with which he introduces the nut on the screw which projects from the bodywork. However when it is a matter of securing large-sized pieces to the bodywork, as occurs with the under-parts of the vehicle which can be between 1 and 1.5 meters in length, the operative encounters serious problems to support the piece on high at the same time as he screws the nuts to the bodywork of the vehicle which is approaching on an assembly line raised above the floor, normally the assistance of another operative being required to perform this operation.

With the object of resolving the problem described, some means are known for provisional fastening of pieces to the fasteners which emerge from the bodywork, such as those disclosed in the Patent of Invention EP 1 273 811.

These fastening means consist of a first tubular element of plastic material which has an axial internal hole drilled of hexagonal section and from the base of which some arched portions of resilient material project which are deformed and break when the first tubular element is pressed onto the fastener, so that the portions are left inside the first tubular element and constitute the walls in which a thread will be formed during its tightening on the fastener. The fastening means also comprises a second tubular element, mounted after the portions, which consists of a circular base provided with some tabs which project above intended to be coupled to the first tubular element, after the breaking of the portions, and subsequent displacement of the first tubular element toward the second tubular element.

The so-called arched portions between which an internal drilled hole is defined fulfil the mission, in a first instance, of being coupled to the fastener to establish thereby a provisional fastening of the piece to the bodywork. Subsequently after applying pressure on the first tubular element and causing the breaking of the portions, said tubular element descends until engaging on the tabs of the second tubular element. Thereafter the first and the second tubular element tighten jointly on the fastener.

By means of this fastening system, a good tightness is not achieved on the fastener, since it can unscrew/loosen as a consequence of vibration.

Moreover the functional complications of this fastening means are associated with the fact that the breaking of the portions is not obtained at the appropriate place, at the point of separation between the portions and the first tubular element, as well as with the fact that a robust and stable joint/connection is not established between the first tubular element and the second tubular element when one piece engages on the other.

The possibility of developing a nut for fastening of simple and effective construction for the purpose of achieving the quick fastening thereof to the fastener of a support, such as a bodywork, is made feasible by the invention which is disclosed below.

DESCRIPTION OF THE INVENTION

The quick fastening nut that this invention discloses is of application in the motor vehicle industry or in any other in which a process intervenes of assembly by screwing of pieces complicated to handle and is intended to optimise the conditions of assembly between pieces for the purpose of minimizing the auxiliary means of support, be they mechanical or manual, employed during the assembly.

The quick fastening nut will usually be connected to the complementary piece to be mounted, for example by means of some tabs which allow a certain mobility of the nut but which establish its connection thereto and prevent it from falling. Moreover on the supporting base (which can be the bodywork of a vehicle), to which it is desired to connect said complementary piece, a fastener is usually firmly attached, which projects perpendicularly.

Thus the fundamental characteristic of the nut object of this invention is defined by the fact that it has means which allow its fastening to the fastener after applying a slight rotation or pressure, so if this operation is carried out on a minimum of two nuts of the piece to be mounted on each corresponding screw, the provisional connection will be made between the complementary piece and the supporting base, without the need to have auxiliary means for supporting the piece during the following screwing phase.

In this way it is possible to relieve the operative or the operatives from the need to support the piece during the screwing, obtaining optimisation of resources especially when it is a matter of handling large pieces.

The nut is fundamentally a broad circular base, a hexagonal body and a central bore or so called "drilled hole" which extends through both the hexagonal body and the base. This drilled hole (as it will be referred to hereinafter) can be essentially triangular in section with rounded corners or in any other form. In the vicinity of the base, the hole has a gradation which defines an expansion with concentric walls on which internal protuberances are established. These have a slight curvature, are positioned in correspondence with the rounded corners, and constitute means for initial engagement between the nut and the fastener after slightly turning or pressing on the former.

The piece is then in position, and so the operative can release the piece and take up the screwdriver to screw the nuts which will turn around the fasteners in such a way that at the same time a thread will be made in the walls which define the central drilled hole by the cutting effect which the metal fastener applies on the plastic walls.

During the process of screwing by means of a screwdriver, driven electrically, pneumatically or otherwise, an excessive pressure is produced and sufficient heat to cause welding between the nut of plastic material and the plastic piece to be joined. If the external surface of the base of the nut is planar, as occurs in most of the nuts, then some partial welds are produced which result in a loss of perpendicularity between the nut and the surface of the piece. The nut object of this invention resolves this problem by having on the underside of its base some concentric circumferential projections which can be toothed, which contribute to facilitate the linear and uniform fastening between the base of the nut and the piece.

DESCRIPTION OF THE DRAWINGS

To complete the description that is being made and with the object of assisting in a better understanding of the characteristics of the invention, in accordance with a preferred practical embodiment thereof, as an integral part of this description, the same is accompanied with a set of drawings wherein, by way of illustration and not restrictively, the following has been represented.

PREFERRED EMBODIMENT OF THE INVENTION

Figure 1:
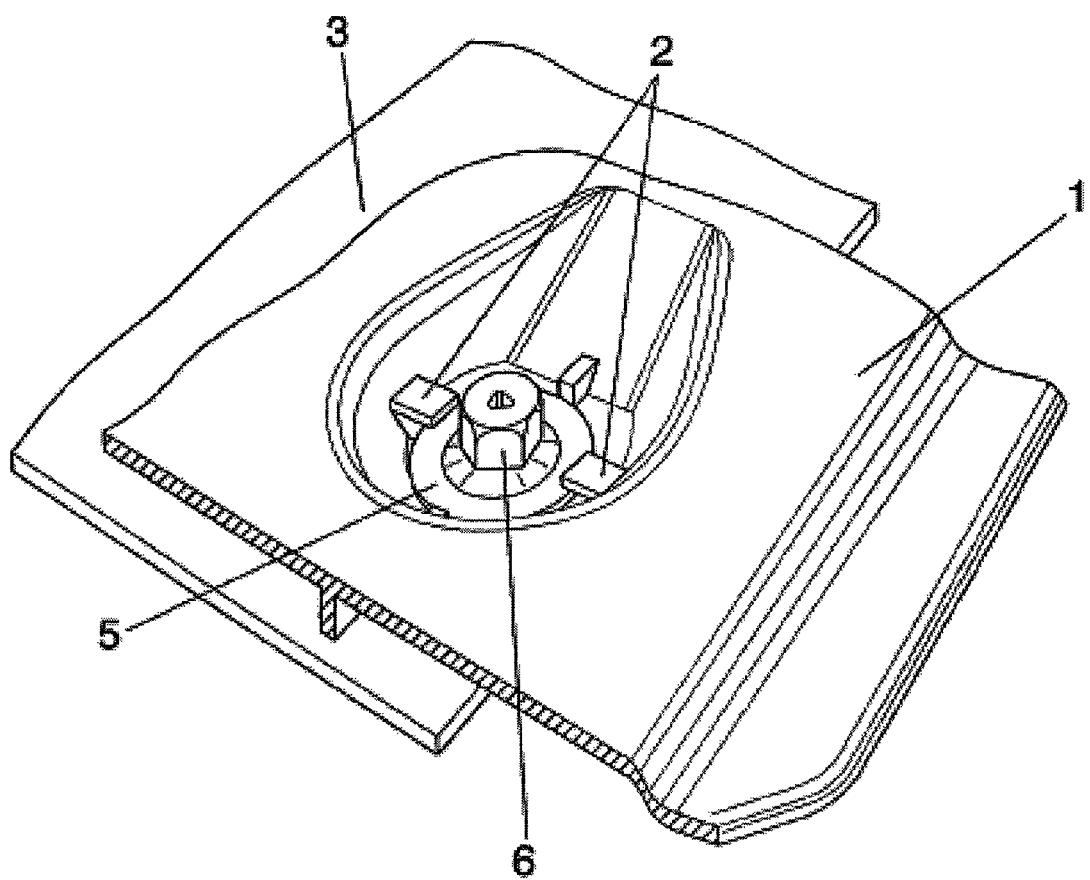
FIG. 1.—It shows a view in perspective of the quick fastening nut mounted in a recess of a complementary piece which is connected to a supporting base which could comprise a vehicle bodywork.
Figure 2:
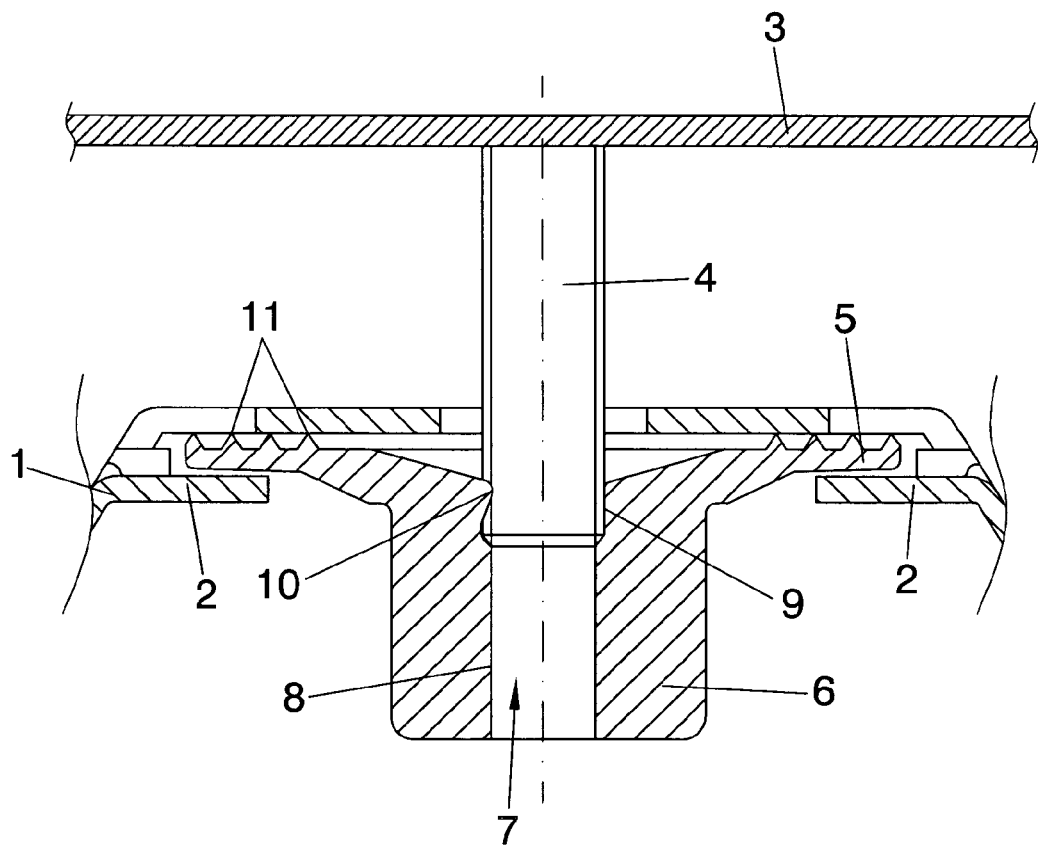
FIG. 2.—It shows a view in cross-section of an elevation of the nut, with the complementary piece, fixed to the fastener of the supporting base in the position prior to the screwing.
Figure 3:
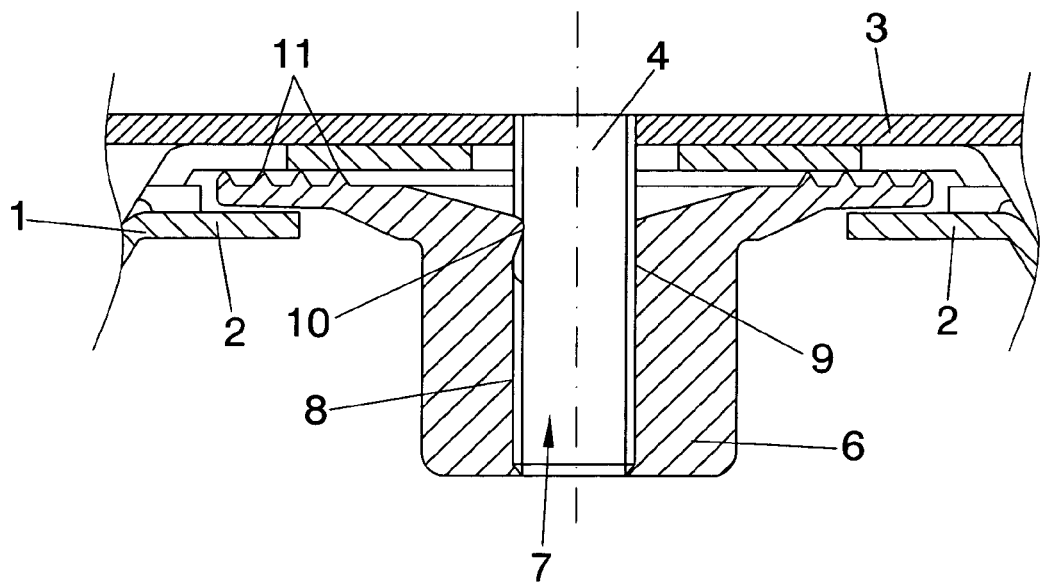
FIG. 3.—It shows a view in cross-section of an elevation corresponding to the situation of connection between the complementary piece and the supporting base, in which one observes the nut after being threaded on the fastener and forming the thread in its central drilled hole.
Figure 4:
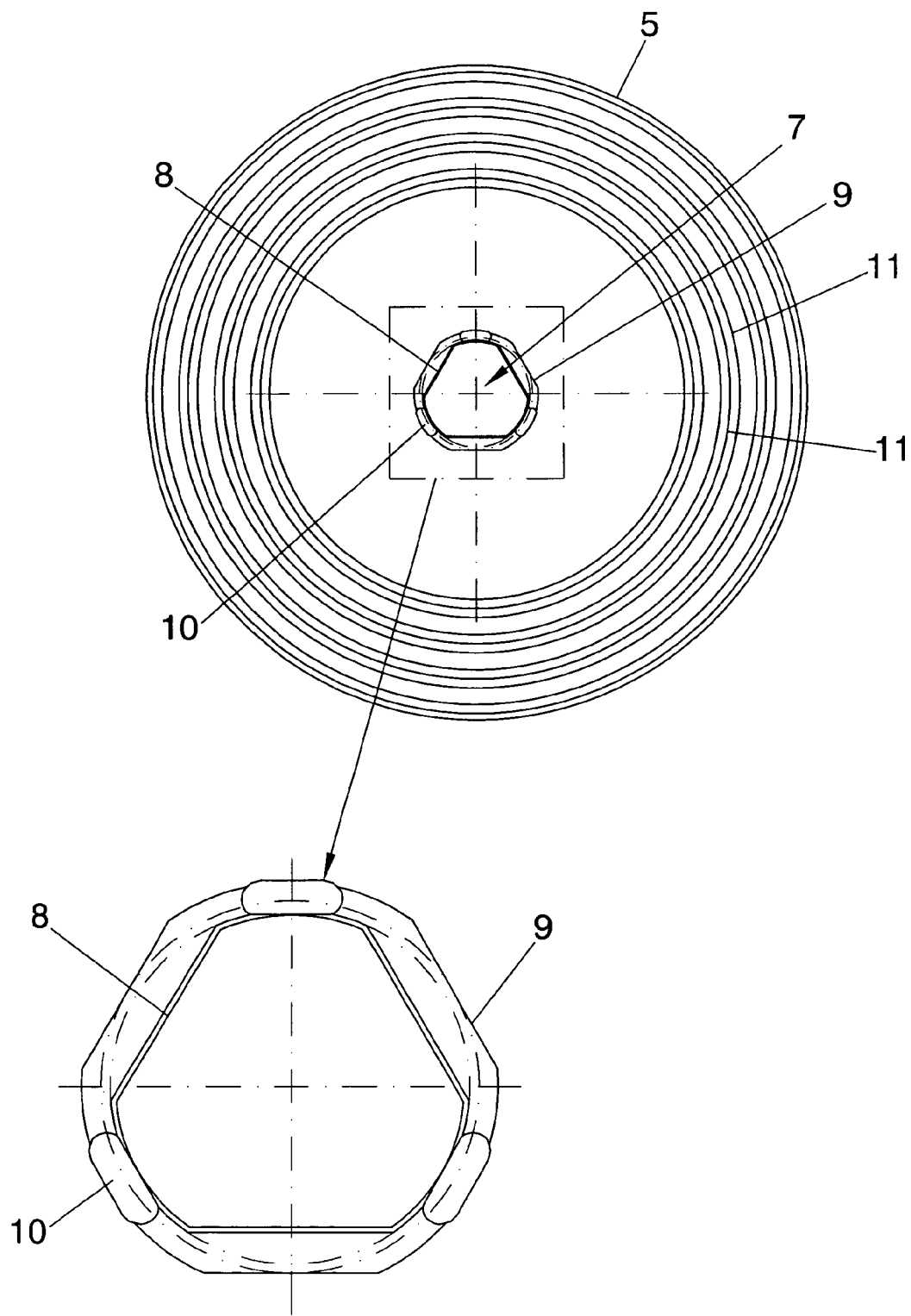
FIG. 4.—It shows a plan view of the quick fastening nut seen from below, as well as showing in detail the opening to the drilled hole through which the fastener will penetrate where the fastening protuberances can be appreciated.

The quick fastening nut which constitutes the object of this invention is of application in the automobile industry or in any other industry in which a process intervenes of assembly by screwing between a complementary piece (1) which can be made of plastic or another material, provided with means for connecting (2) to the nut and a supporting base (3), which can comprise the bodywork of a vehicle, from which a fastener (4) emerges perpendicularly, the nut being constituted from a circular base (5) and a hexagonal body (6) which extends centrally and above the circular base (5).

Starting from this basic configuration the quick fastening nut is fundamentally distinguished in that it has a central drilled hole (7) passing through, which traverses the hexagonal body (6) and the circular base (5), which has a main segment (8) and a gradation in the vicinity of the circular base (5) which defines an expansion (9) in which there are some slightly arched internal protuberances (10) which constitute the fastening means for the connection of the nut to the fastener (4) after a slight rotation or pressure of the former and it determines the fastening and provisional positioning of the complementary piece (1) with respect to the supporting base (3) prior to its screwing, which is carried out thereafter by the cutting effect that the metal fastener (4) applies, giving rise to a thread in the walls of the drilled hole (7).

The main section (8) of the drilled hole (7) can have any cross-section, it being envisioned in a possible embodiment that said section is essentially triangular with rounded corners which rotates around the fastener (4) during the operation of screwing the nut.

The expansion (9) of the drilled hole (7) has a section concentric with that of the main segment (8) and the internal protuberances (10) are located in correspondence with the rounded corners which can be in the expansion (9).

The circular base (5) of the nut has some concentric circumferential projections (11) on its underside, which can be toothed and which contribute to facilitate the uniform fastening between the circular base (5) and the complementary piece (1) once the nut is screwed on.

The invention claimed is:

1. A quick fastening nut: comprising:
   a circular base and a hexagonal body arranged coaxially with the circular base, and
   a coaxial non-circular through hole which extends through the hexagonal body and the circular base, which has a main segment and a gradation in the vicinity of the circular base that defines an expansion having arched internal radial inwardly extending protuberances which are configured to facilitate initial connection of the nut to a threaded member and a cutting of a thread in a wall portion of the through hole,
   wherein the main segment of the non-circular through hole has an essentially triangular cross-section as taken normally to an axis of the through hole, wherein the essentially triangular cross-section of the main segment of the non-circular hole has three straight sides and three rounded corners which each respectively merge smoothly with two of the straight sides, and wherein the three rounded corners each have a center of curvature which is coincident with the axis of the through hole and orbit around the threaded member when the nut is screwed onto the threaded member; and
   wherein the protuberances are positioned radially outward of an imaginary line drawn between the ends of each of the rounded corners of the main segment which has the essentially triangular cross-section.

2. A quick fastening nut according to claim 1, wherein the expansion of the through hole has a section concentric with that of the main segment.

3. A quick fastening nut according to claim 1, wherein the internal protuberances are located radially outward of and in correspondence with the rounded corners.

4. A quick fastening nut according to claim 1, wherein the circular base of the nut has on its underside, concentric circular projections for facilitating uniform fastening between the circular base and a component adapted to be secured in place by the nut once the nut has been screwed onto the threaded member.

5. A quick fastening nut according to claim 4, wherein the circumferential projections each have, in cross-section, a shape of a pointed tooth.

6. A quick fastening nut according to claim 1, wherein the internal protuberances are located radially outward of and in a predetermined spatial relationship with the rounded corners.

7. In combination,
a quick fastening nut according to claim 4, and
a component secured in place by the nut screwed onto a threaded member, wherein the component includes connecting members that extend above and below the circular base to maintain the nut in situ on the component and thus facilitate connection of the component in place.

8. The combination according to claim 7, further comprising:
a supporting base of a vehicle,
wherein the threaded member is rigidly connected with the supporting base of the vehicle to enable connection of the component in a predetermined location on the supporting base of the vehicle.

9. A quick fastening nut: comprising:
a coaxial circular base and an integral hexagonal body having a non-circular coaxial through hole, the through hole having:
a main segment having a triangular cross-section taken normally to a longitudinal axis of the through hole, corners of the triangular cross-section being rounded with a center of curvature coincident with the longitudinal axis of the through hole, and
an expansion comprising arched internal radial inwardly extending protuberances for facilitating initial connection of the nut to a threaded fastener member,
wherein the protuberances are positioned radially outward of an imaginary line drawn between the ends of each of the rounded corners of the main segment which has the triangular cross-section.

10. A quick fastening nut according to claim 9, wherein said nut is entirely made of a single plastic material.

11. A quick fastening nut according to claim 9, wherein said through hole is entirely unthreaded until the nut is screwed onto the threaded member.

12. A quick fastening nut according to claim 9, wherein
each of said protuberances has a tip portion defining a radially innermost portion of said protuberance, and
an inner wall of the expansion of the through hole continuously and obliquely extends from said tip portion radially outwardly and axially away from the main segment up to an end face of the base.

13. A quick fastening nut according to claim 12, wherein
said end face of the base is radially outward of the hexagonal body and includes concentric circular projections for facilitating uniform fastening between the circular base and a component adapted to be secured in place by the nut once the nut has been screwed onto the threaded member.

14. A quick fastening nut according to claim 12, wherein said nut is entirely made of a single plastic material.

15. A quick fastening nut according to claim 14, wherein said through hole is entirely unthreaded until the nut is screwed onto the threaded member.

16. A quick fastening nut, comprising:
a hexagonal body;
a base extending integrally and radially outwardly from an end of the hexagonal body; and
a through-hole extending through said body and base and including:
a main segment in the hexagonal body, said main segment having a non-circular cross-section as taken normally to a longitudinal axis of the through hole,
wherein the cross-section of the main segment has a plurality of rounded corners each having a center of curvature which is coincident with the axis of the through an expansion in which the through hole flares radially outwardly in a direction away from the main segment and toward an end face of the base;
wherein the expansion comprises protuberances extending radially inwardly from locations, which are positioned radially outward of an imaginary line drawn between the ends of each of the rounded corners of the main segment that has the non-circular cross-section, for facilitating initial connection of the nut to a threaded fastener member.

17. A quick fastening nut according to claim 16, wherein an entirety of said nut is an integral member made of a single plastic material.

18. A quick fastening nut according to claim 16, wherein said through hole is entirely unthreaded until the nut is screwed onto the threaded member.

19. A quick fastening nut according to claim 16, wherein the protuberances are located in correspondence with the rounded corners, respectively.

20. A quick fastening nut according to claim 16, wherein
each of said protuberances has a tip portion defining a radially innermost portion of said protuberance, and
an inner wall of the expansion of the through hole continuously and obliquely extends from said tip portion radially outwardly and axially away from the main segment up to the end face of the base.

* * * * *